K. E. STAHL.
LAWN MOWER SHARPENER.
APPLICATION FILED MAY 21, 1913.

1,129,133.

Patented Feb. 23, 1915.

2 SHEETS—SHEET 1.

Witnesses
William E. Baff.
A. Gordon Hamilton

Inventor
K. E. Stahl
By Charles R. Pierce
Attorneys

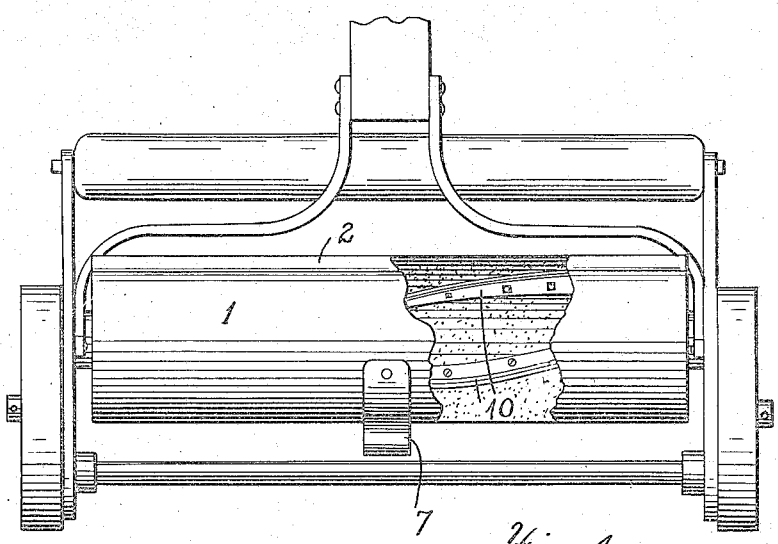
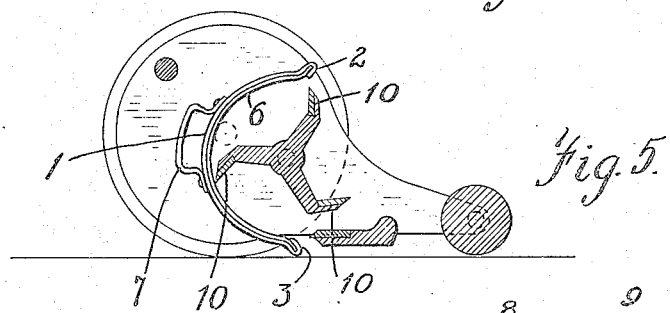
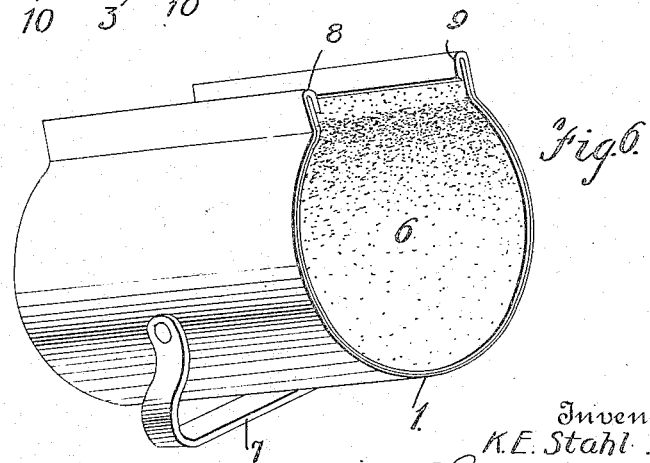

UNITED STATES PATENT OFFICE.

KARL E. STAHL, OF CHEYENNE, WYOMING, ASSIGNOR OF FIFTY AND ONE-THIRD ONE-HUNDREDTHS TO FRANK J. BON, OF CHEYENNE, WYOMING.

LAWN-MOWER SHARPENER.

1,129,133.      Specification of Letters Patent.      Patented Feb. 23, 1915.

Application filed May 21, 1913. Serial No. 769,079.

*To all whom it may concern:*

Be it known that I, KARL E. STAHL, a citizen of Sweden, residing at Cheyenne, in the county of Laramie and State of Wyoming, have invented certain new and useful Improvements in Lawn-Mower Sharpeners, of which the following is a specification.

This invention relates to lawn mower sharpeners and more particularly to improvements in that type of sharpeners in which emery paper or the like is utilized.

The object of my invention is to provide a simple, inexpensive, and highly efficient device of the character described by means of which the renewal of wornout emery paper may be rendered easy, and by means of which the operation of shaping the blades of the mower can take place in a short interval of time.

With the above and other objects in view my invention consists in the combination, arrangement, and details of construction disclosed in the specification and drawings and then more particularly pointed out in the appended claims.

Figure 1:
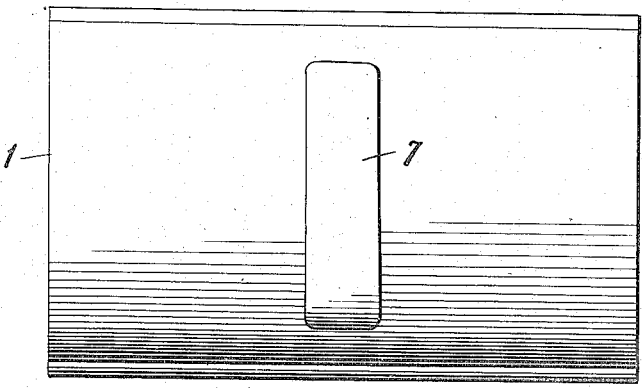
Figure 2:
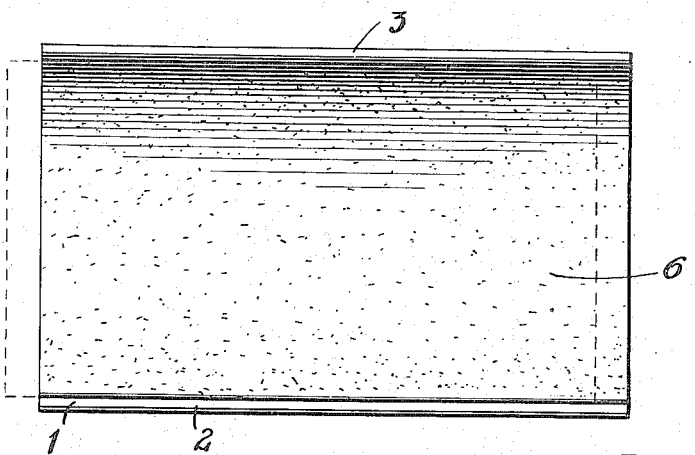
Figure 3:
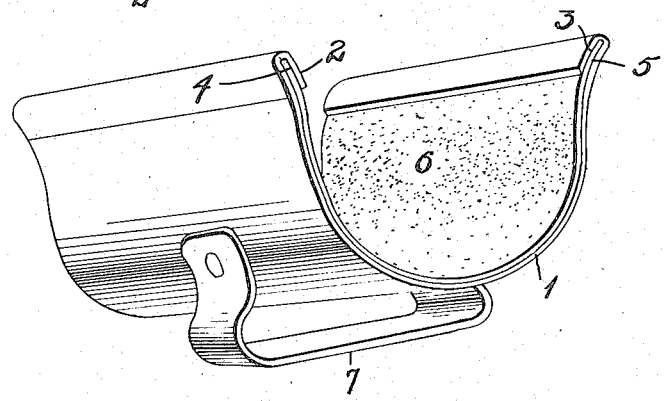

In the drawings wherein similar reference characters designate similar parts throughout the respective views, Figure 1 is a bottom plan view of my invention, Fig. 2 is a top view thereof, Fig. 3 is a detail perspective view of my invention, Fig. 4 is an elevation of a lawn mower, showing the correct position of my invention relatively thereto, my invention being shown partly broken away, Fig. 5 is a cross sectional view of the blades of a mower shown relatively to my blade sharpener, and Fig. 6 is a view of a modification of my invention.

Reference being made to the accompanying drawings which are merely illustrative of my invention, there is illustrated a sharpener for lawn mowers and the like which may be made in various designs.

The leading feature of my invention consists in providing a sharpener arcuate in shape, which will be yieldable under the action of the mower blades, and which can be applied against the blades of the lawn mower with facility.

1 designates a U shaped member made preferably of suitable resilient or spring metal. In the example shown in Figs. 1-5 the sharpener is shown to flare outwardly, but this is not necessary as is shown in the modification illustrated in Fig. 6, where it will be noticed that the sharpener takes the outline substantially that of a segment of a circle. Formed upon the free ends of member 1 are the return marginal portions 2 and 3 forming guides or tracks for the reception of the terminals 4 and 5 of a flexible sheet 6 having a grinding surface made of emery, or of any other suitable material well known to those skilled in the art. It is evident that the grinding sheets may be U shaped in contour before being inserted into the return portions 2 and 3. It will be noticed that the emery sheet 6 is adapted to be applied to member 1 while flat, being of a sufficient size so as to contact the effective bearing surface of member 1, said sheet conforming to the contour of said member by virtue of its own resiliency and being held against displacement by the return portions 2 and 3 hereinbefore mentioned. It will be readily seen that an emery sheet may be easily slid into or out of the guides formed by said return portions as indicated in dotted lines in Fig. 2. The handle 7 is secured to the top of member 1 by virtue of which it may be easily manipulated. In Fig. 6 I show member 1 having substantially parallel terminal portions 8 and 9 upon which the return portions are formed.

In practice the sharpener will be applied to the blade of the lawn mower in the manner illustrated in Figs. 5 and 6. The user will grasp handle 7 and hold member 1 in such a position, preferably, whereby the return portions will be in vertical alinement. Then by causing blades 10 of the mower to successively rub against the emery surface of sheet 6, while the mower is turned in a direction opposite to that required to effect a cutting action, said blades will be sharpened, each blade moving practically across the entire grinding surface of member 1, an advantage over prior devices which is very marked.

From the above it will be seen that I have provided a sharpener for lawn mowers which is extremely simple in construction, attractive in design and well adapted to yield slightly, if necessary, against the rubbing action of the blades so that the desired uniform keenness of the blades may be attained.

While I have described the details of construction of my invention I do not mean to limit myself thereto but claim all variations and modifications within the purview of the appended claims.

What I desire to claim and secure by Letters Patent is:—

1. A lawn mower sharpener comprising an arcuate resilient member having oppositely disposed inwardly turned flanges, and a flexible abrading member located within said arcuate member and having opposite edge releasably held respectively by said flanges.

2. A lawn mower sharpener comprising an arcuate resilient sheet metal member having inwardly turned flanges at the respective ends of the arch and adapted to releasably embrace opposite ends of a flexible abrading sheet, and a handle secured to the outer side of said member and disposed transversely to said flanges.

In testimony whereof I have affixed my signature in presence of two witnesses.

KARL E. STAHL.

Witnesses:
A. D. JOHNSTON,
CHARLES E. LANE.